(12) United States Patent
Wu et al.

(10) Patent No.: US 8,566,131 B1
(45) Date of Patent: Oct. 22, 2013

(54) INSURANCE POLICY HOLD

(75) Inventors: Wan-Chien Wendy Wu, Cupertino, CA (US); Kenneth W. Luekens, San Ramon, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

(21) Appl. No.: 13/432,690

(22) Filed: Mar. 28, 2012

Related U.S. Application Data

(60) Provisional application No. 61/469,765, filed on Mar. 30, 2011.

(51) Int. Cl.
*G06Q 40/00* (2012.01)
(52) U.S. Cl.
USPC .............................................................. 705/4
(58) Field of Classification Search
USPC .............................................................. 705/4
See application file for complete search history.

(56) References Cited

U.S. PATENT DOCUMENTS

| 2009/0099877 A1* | 4/2009 | Hyde et al. ........................ 705/4 |
| 2010/0004954 A1 | 1/2010 | Pelenur et al. |
| 2011/0112874 A1* | 5/2011 | Collins et al. ..................... 705/4 |

\* cited by examiner

*Primary Examiner* — Samica L Norman
(74) *Attorney, Agent, or Firm* — Van Pelt, Yi & James LLP

(57) ABSTRACT

Managing insurance policy processing includes: receiving a set of insurance policy hold criteria specifying an insurance policy hold, the insurance policy hold criteria comprising an insurance policy hold period during which the insurance policy hold is in effect; receiving a request to execute an insurance policy processing operation on an insurance policy; determining, based at least in part on the set of policy hold criteria, that the insurance policy processing operation is subject to the insurance policy hold; disallowing the insurance policy processing operation from being executed; determining that the insurance policy hold is to be released; and allowing the insurance policy hold to be released.

30 Claims, 12 Drawing Sheets

| Update | Cancel |

Hold Details | Hold Regions

Hold Type * [Underwriting Hold ▼] — 302
                              — 304  Localization Text

| Language | Description | Long Description |
|---|---|---|
| English (US) | Hurricane | Hurricane |
| French (Canada) | | |

Code * [Hurricane]
Description * [Hurricane] — 306
Hold Start Date * [01/26/2012] 🗓 — 308
Hold End Date [ __/__/____ ] 🗓 — 310

UW Issue Info

UW Issue Type * [UW Policy Hold ▼] — 312
Long Description * [Hurricane] — 314

— 316

Hold Rules

| Add | Remove |

| ☐ | • Line of Business | • Job | • Job Date Type | • Coverage |
|---|---|---|---|---|
| ☐ | Personal Auto ▼ | Submission ▼ | Effective Date ▼ | All coverages |

| Hold Details | Hold Regions | |
|---|---|---|
| Add Hold Region \| Remove | | |
| ☐ | * Region Type | * Region Code △ |
| ☐ | County | CA:Imperial |
| ☐ | County | CA:Kern |
| ☐ | County | CA:Los Angeles |
| ☐ | County | CA:Orange |
| ☐ | County | CA:Riverside |
| ☐ | County | CA:Sacramento |

FIG. 3B

| Quote | | | | | | | |
|---|---|---|---|---|---|---|---|
| < Back | Next > | Release Lock | Edit Work Order | Save Draft | Versions ▼ | Bind Options ▼ | Close Options ▼ | Print |

This quote will require underwriting approval prior to binding.

| | | | |
|---|---|---|---|
| Submission Number | 136411 | Total Premium | $718.00 |
| Policy Period | 01/26/2012 - 07/26/2012 | Taxes & Surcharges | $52.00 |
| Primary Named Insured | Ray Newton | Total Cost | $770.00 |
| Policy Address | 1253 Paloma Ave | | |
| | Floor 0000 | | |
| | Arcadia, CA 91007 | | |
| County | San Mateo | | |
| Country | United States of America | | |
| Address Type | Home | | |
| Address Description | Created by the Address Builder with code 0 | | |

| Policy Premium |
|---|

Garage 1: 1253 Paloma Ave, Floor 0000, Arcadia, CA 91007

FIG. 4

INSURANCE POLICY HOLD

CROSS REFERENCE TO OTHER APPLICATIONS

This application claims priority to U.S. Provisional Patent Application No. 61/469,765 entitled INSURANCE POLICY HOLD filed Mar. 30, 2011 which is incorporated herein by reference for all purposes.

BACKGROUND OF THE INVENTION

Typically, when a customer wishes to purchase or update an insurance policy, he works with an insurance agent to provide information and obtain quotes. A quoted insurance policy typically requires review and approval by an underwriter for the insurance company before it can be bound and become legally binding.

There are circumstances under which an insurance company may not allow certain operations to take place. For example, when the weather forecast indicates that a certain area will experience a hurricane in a few days, no new policy or updates to existing policies would be permitted until the weather condition passes. As another example, the rates for certain insurance products may be under regulatory review by the insurance bureau; therefore, no quotes can be generated for such products until regulatory approvals are obtained.

Currently, putting certain insurance policy related actions on hold is typically a manual process. The insurance agents or underwriters have to remember that certain actions for certain products are on hold so that they do not proceed with the unpermitted actions. The manual hold processing can be unreliable and error-prone, and can expose the insurance company to unwanted risks.

BRIEF DESCRIPTION OF THE DRAWINGS

Various embodiments of the invention are disclosed in the following detailed description and the accompanying drawings.

FIGS. 3A-3B are functional diagrams illustrating an embodiment of a user interface for creating a policy hold.

FIG. 4 is a functional diagram illustrating an embodiment of a user interface that shows a policy processing operation that is subject to the hold.

DETAILED DESCRIPTION

Figure 1A:
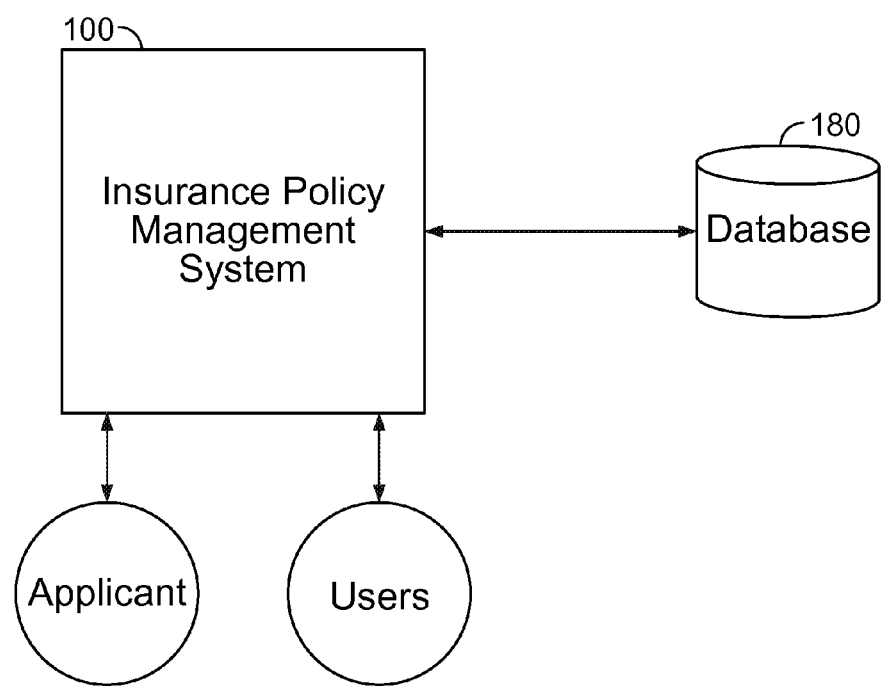
FIG. 1A is a block diagram illustrating an embodiment of an insurance policy management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for automated management of insurance policy holds is described. In some embodiments, policy hold information is received. The policy hold information is specified by an administrator with privileges to create or modify the policy hold information. The policy hold information includes a hold period during which one or more insurance policy processing operations are put on hold. In some embodiments, the policy hold information further includes a set of criteria specifying the characteristics of the insurance policies and/or operations to which the hold applies. When a user (such as an underwriter or an insurance agent) invokes an insurance policy processing operation for an insurance policy, and such an operation has been specified to be put on hold, an underwriting issue is automatically created, and the operation is automatically prevented from being executed. In some embodiments, notification is sent to the user explaining the reasons behind the hold. The insurance processing operation is allowed to proceed only when the policy hold is released.

FIG. 1A is a block diagram illustrating an embodiment of an insurance policy management environment. Insurance policy management system 100 may be implemented using one or more computing devices such as general purpose servers, special purpose devices, or other hardware/software/firmware combinations that include one or more processors, and one or more memories coupled to the processors and configured to provide the processors with instructions. In some embodiments, system 100 is a Java Platform server and the functions of insurance management are implemented as Java code executing on the server. Other programming languages may be used in different embodiments. In the example shown, system 100 is coupled to an insurance policy and issues database 180, which may be implemented using Oracle™, DB2, or other appropriate database applications. In various embodiments, the database is implemented on a separate device from the insurance policy management system, on the same device, or partly on a separate device and partly on the same device. Although a single database is shown, separate databases can be used to store policies and issues relating to the policies.

In some embodiments, the insurance management system provides a user interface (for example, a web-based application interface) for potential customers (also referred to as applicants) to directly apply for policies online. Alternatively, the applicants may contact an agent, who collects information from the applicants and submits the information to the insurance management system. As used herein, insurance agents, underwriters, and other personnel of the insurance company/companies with access to system 100 and have authority to initiate and/or modify applicant's policy are referred to as users of the system. Insurance policy information and issues associated with each policy are stored in the database and updated as needed.

Figure 1B:
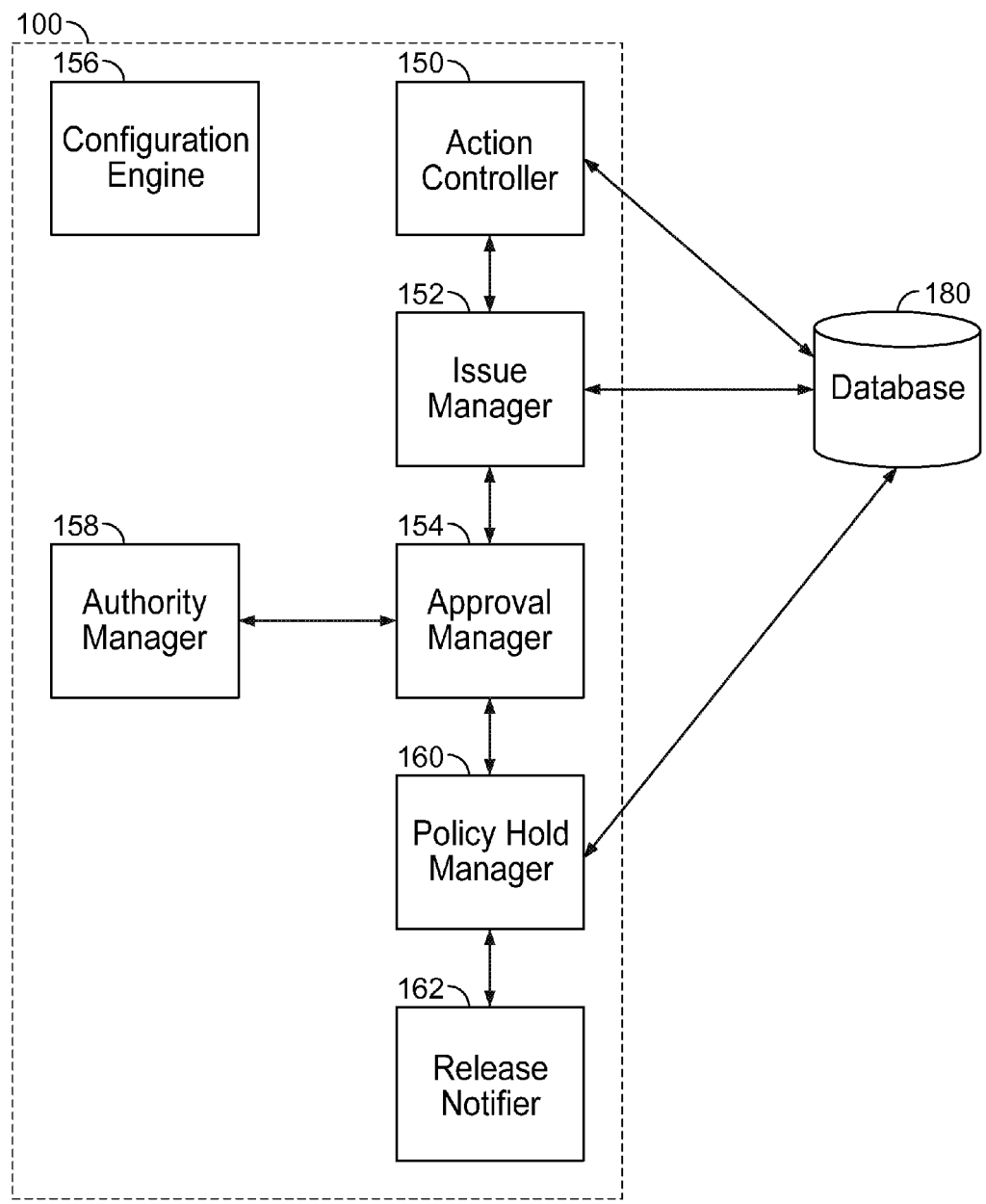
FIG. 1B is a block diagram illustrating an embodiment of an insurance policy management system.

FIG. 1B is a block diagram illustrating an embodiment of an insurance policy management system. In this example, system 100 includes a number of components that interact and cooperate to manage the underwriting process (including creation of new policies and updates to existing policies). A configuration engine 156 facilitates, among other things, the configuration of policies, rules about the policies, issues associated with policies, and approval levels associated with the users. In this example, the underwriting process includes a number of actions separated by a number of blocking points. An action controller 150 controls the execution of the actions. During the underwriting process, issues associated with the policy are generated. An issue manager 152 detects issues associated with the policy and performs issue handling logic, and updates the issues in database 180 as appropriate. An approval manager 154 interacts with issue manager 152 to provide user approvals of various issues. An authority manager 158 controls the authority grant levels of users in the system, and cooperates with approval manager 154 to determine whether a user has the right level of authority to approve an issue.

In this example, certain administrators with special privileges are permitted to create/edit policy holds, including respective hold criteria for each policy hold, via user interface facilities supported by policy hold manager 160. Examples of policy holds include underwriting holds such as holds due to weather affecting a geographical area, and regulatory holds such as holds due to pending regulatory approval.

The policy holds are stored in database 180 in this example. A policy hold will cause one or more issues pertaining to the policy hold to be generated. Policy hold related issues can be stored in the same database table as the other issues, stored in a policy hold issue table separate from the issues table in the database, or in a separate database. In the example shown, the policy hold related issues are stored in database 180. A release notifier 162 (sometimes referred to as a batch processor) is configured to iterate through the policy hold issues, inspect the policy holds that correspond to the policy hold issues, determine whether the policy holds are still in effect, and send notification information to the appropriate users when a policy hold no longer applies. Details of operations of policy hold manager 160 and release notifier 162 are described below.

The components described above can be implemented as software components executing on one or more general purpose processors, as hardware such as programmable logic devices and/or Application Specific Integrated Circuits designed to perform certain functions or a combination thereof. In some embodiments, the components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The components may be implemented on a single device or distributed across multiple devices. The functions of the components may be merged into one another or further split into multiple sub-components.

Figure 1C:
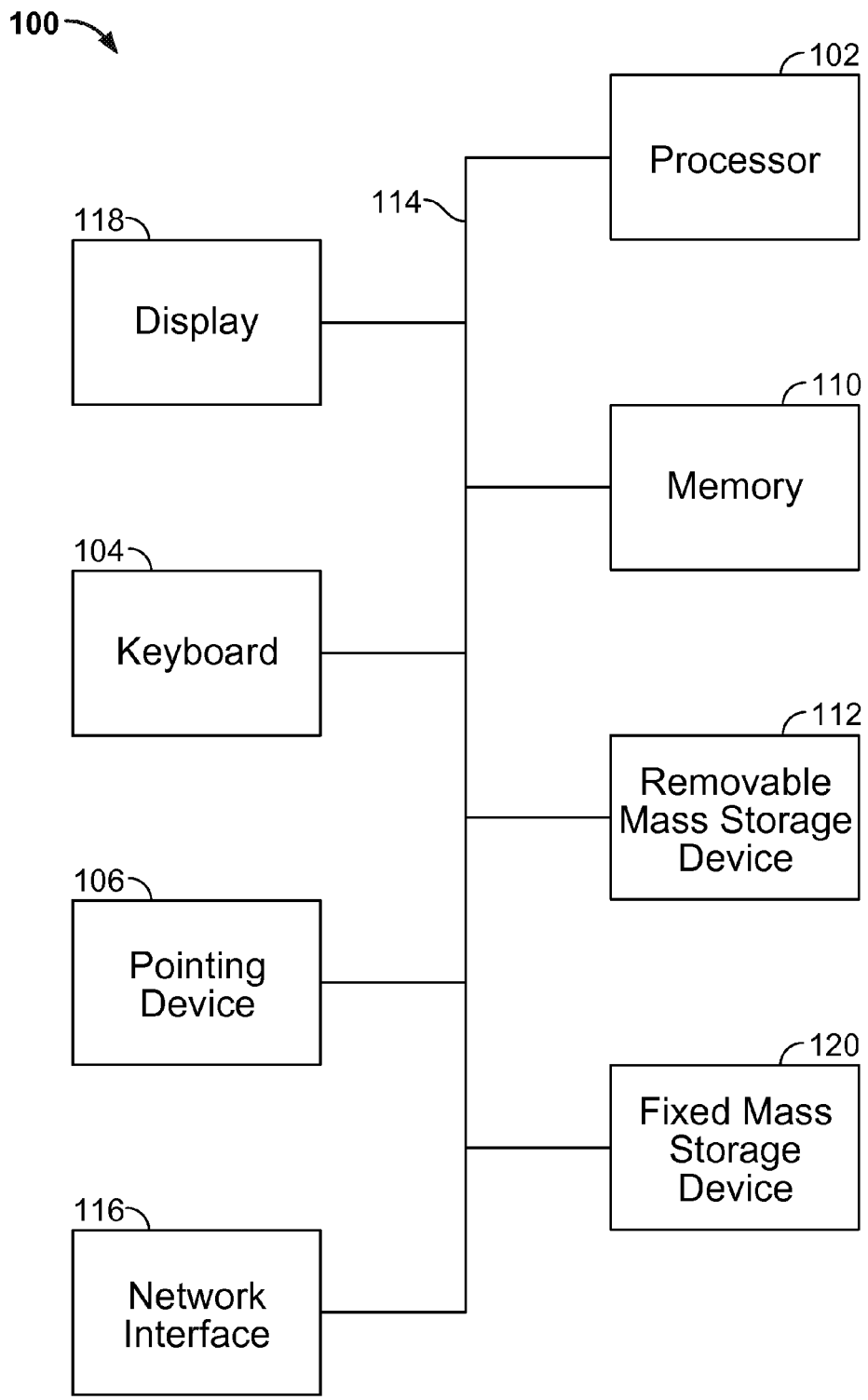
FIG. 1C is a functional diagram illustrating a programmed computer system for managing insurance policies in accordance with some embodiments.

FIG. 1C is a functional diagram illustrating a programmed computer system for managing insurance policies in accordance with some embodiments. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118).

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
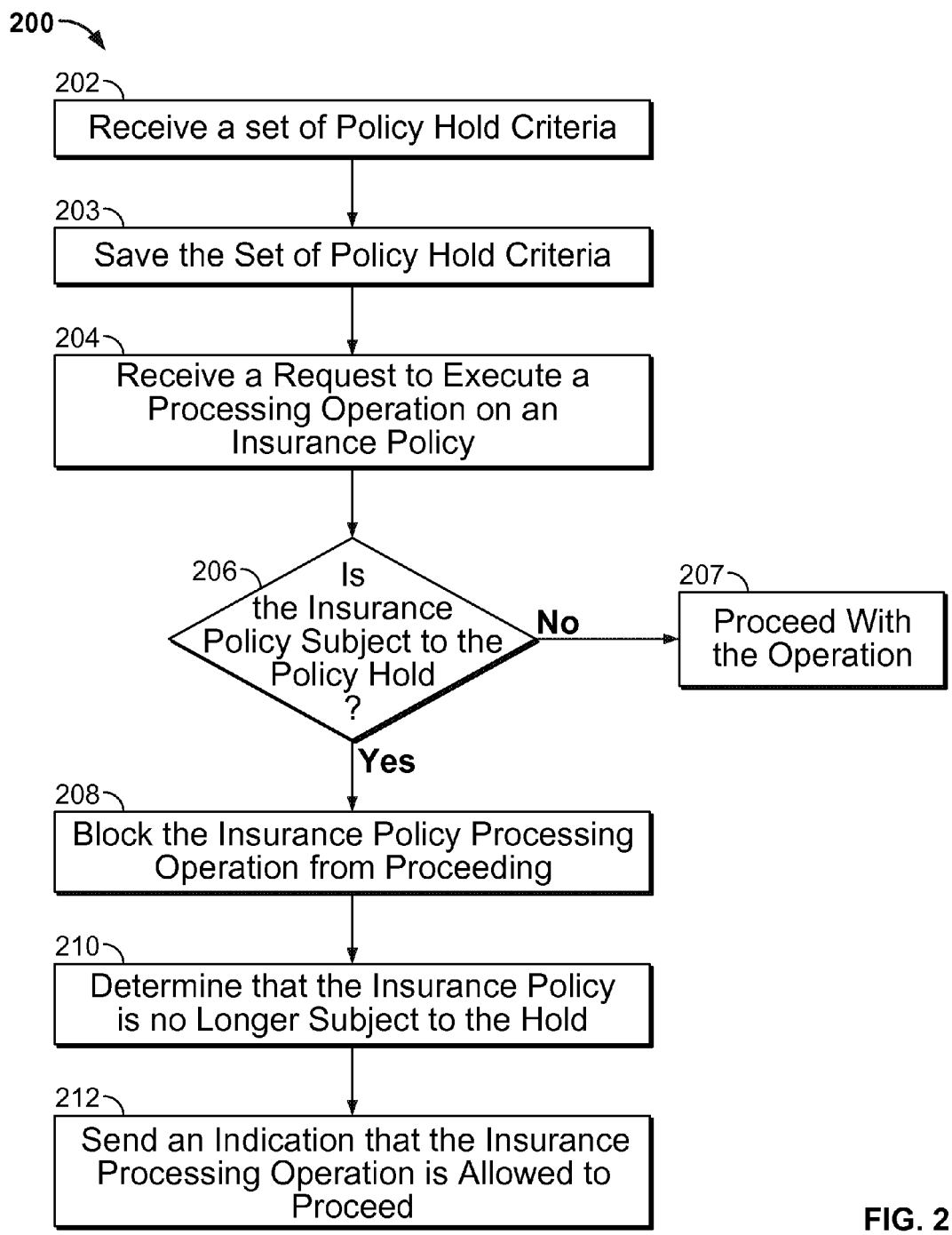
FIG. 2 is a flowchart illustrating an embodiment of a process for managing policy holds.

FIG. 2 is a flowchart illustrating an embodiment of a process for managing policy holds. Process 200 may be performed on a system such as 100.

At 202, a set of policy hold criteria specifying a policy hold is received. In some embodiments, the criteria include the effective hold period during which the hold is in effect. The hold period can be specified with a start date and an end date, a start date and a length of time, an end date and a length of time, or any other appropriate format. The hold period can also be specified as on-going or lasting indefinitely (e.g., with a specific start date but no specific end date). Other criteria such as the geographical location of the area subject to the hold can also be entered. In some embodiments, the hold criteria includes hold rules specifying the line of business to which the policy belongs (e.g., home owner, personal automobile, commercial property, etc.), the type of operation (also referred to as transaction or job) subject to the hold (e.g., quote operation, bind operation, etc.), or any other appropriate attributes. In some embodiments, the policy hold is applicable to all policies that match the criteria. Example user interfaces supplied by a configuration engine for creating a policy hold are illustrated in FIGS. 3A-3B.

At 203, the policy hold criteria are saved. In various embodiments, the information is saved to a database, a file, and/or a data structure in memory.

Steps 202-203 can be repeated and multiple sets of policy hold criteria for a number of holds can be set up. Once the policy hold criteria are set up, the policy management system is ready to handle policies and their associated processing operations that may be subject to the hold. Returning to FIG. 2, at 204, a request to execute a processing operation on an insurance policy is received. In some embodiments, the request is received from an insurance policy configuration and management application. As used herein, an insurance processing operation corresponds to a specific set of tasks performed by one or more users or the system in a particular policy underwriting stage. Examples of insurance processing operations include initial policy submission, policy editing, quote preparation, policy binding, policy issuing, and any other appropriate operations to be carried out for purposes of underwriting an insurance policy. An insurance processing operation may be performed by one or more users, as well as automatically by the system.

At 206, based at least in part on the set of policy hold criteria and using a processor, it is determined whether the insurance policy processing operation is subject to the policy hold. In some embodiments, the determination is made by matching attributes of the policy that are being operated on to the stored policy hold criteria. In the event that a match is found, the policy processing operation is subject to the policy hold. For example, the line of business, transaction type, location, and date associated with the policy are compared with the policy hold criteria, and the policy is deemed to be subject to the policy hold when all four attributes match.

For example, assume that the set of policy hold criteria specifies a hold that applies to the personal automobile line of business, the submission transaction type, in San Mateo County, Calif., with a start date of Jan. 26, 2012 and an end date of Feb. 1, 2012. When a policy processing operation request is received, it is compared with the set of hold criteria, and only an operation that is for a personal automobile policy, corresponds to a submission transaction type, has an effective period that overlaps Jan. 26, 2012 and Feb. 1, 2012, submission operation for a personal auto policy in San Mateo County and with an effective date overlapping the hold period (e.g., an effective date starting on Jan. 27, 2012) is received, the submission operation and the policy are determined to match the hold criteria and therefore are subject to the hold.

Insurance companies often allow policies to be backdated. In other words, a new policy can have an effective period (i.e., the period during which the policy is in effect) that begins earlier in time than its written date (i.e., the date on which the policy is entered into the system). Similarly, updates to a policy can also have an effective date that begins earlier than its written date. Thus, without additional checks, a user may be able to get around a policy hold by issuing or updating a policy that is backdated. For example, if a policy hold due to a hurricane starts on Jan. 26, 2012, and if the user were permitted to issue, on Jan. 27, 2012, a policy with an effective period of Jan. 20, 2012-Jan. 19, 2013, he could create a policy that covered damages due to the hurricane after the disaster had happened. This is clearly undesirable to the insurance carriers. Thus, in some embodiments, the determination of whether the insurance policy processing operation is subject to the policy hold includes recording the written date of the policy processing operation, and checking the written date of the policy, its effective period, and the hold period. Specifically, the written date associated with the insurance policy processing operation is compared with the start date of the hold period, and the effective period of the policy is compared with the hold period. If the written date is on or after the start date of the policy hold, and if the effective period of the policy overlaps with the hold period, then the policy processing operation is subject to the policy hold. Referring to the earlier example, the issuance of the policy would be subject to the hold since its written date of Jan. 27, 2012 is after the start date of the hold period, and the policy's effective period overlaps with the hold period.

Sometimes a policy pertains to multiple locations. For example, a home owner's policy may include coverages for several homes at different locations; a personal automobile policy may include different garage locations for separate cars. In some embodiments, if any of the locations associated with a policy matches the policy hold location, the policy processing operation is subject to the policy hold.

If the policy processing operation is not subject to the policy hold, at 207, it is allowed to proceed. Otherwise, at 208, the insurance policy processing operation is not allowed to proceed. In some embodiments, an underwriting issue is created and stored in a database, thus blocking the policy processing operation from going forward. Details of how to create and handle the underwriting issue are described below. In some embodiments, a notification indicating the reason for the hold is optionally presented to the user.

The policy hold can be released at some point. For example, a hold period with a specified end date may expire on that date; an event that ends the policy hold (e.g., the passing of the hurricane, the receiving of regulatory approval) may occur. The release can be automatic (e.g., based on the expiration of a timer or the detection of a certain event trigger) or manual (e.g., based on an indication received from a user that the hurricane has passed or the regulatory approval has been received). In some embodiments, certain users with appropriate privileges can override the policy hold. For example, if a customer with a large account wants to purchase some additional hurricane coverage for the hold period, an administrative user with certain authority level (such as a manager at the insurance company) may release the hold and allow the transaction to proceed.

At 210, it is determined that the policy processing operation is no longer subject to the policy hold. In some embodiments, a batch process (e.g., release notifier 162 of FIG. 1B) periodically checks for policies and corresponding operations that are on hold to determine which ones can be released. In some embodiments, whenever an operation is updated (e.g., the user attempts to re-execute the operation), all the current applicable policy holds are applied. Thus, the batch process only needs to identify policies that are on hold and have not been changed since last time a policy hold was updated, and check their associated operations to determine whether they are still subject to the policy hold.

At 212, an indication that the insurance processing operation is allowed to proceed is sent to the user (so that he can decide whether to execute the processing operation again), or the policy processing operation is automatically invoked.

FIGS. 3A-3B are functional diagrams illustrating an embodiment of a user interface for creating a policy hold. The user interface can be invoked by a user with appropriate privileges, within a policy management application. The user interface embodiment of FIG. 3A shows details of the hold. User interface control 302 allows the user to choose the type of hold (e.g., an underwriting hold or a regulatory hold); controls 304 and 306 allow the user to enter a code and a description pertaining to the hold; controls 308 and 310 allow the user to specify a hold start date and a hold end date. In this case, the hold is put in place due to a hurricane that is forecasted in an area. Thus, the user chooses underwriting hold as the hold type, enters the code and the description "Hurricane," and specifies a start date of Jan. 26, 2012. A hold end date is not specified at this point, since it is yet unknown when the hurricane will pass the region. A specific underwriting issue would be generated in connection with this hold, and the user is allowed to specify, via user interface controls 312 and 314, respectively, the type of underwriting issue that is generated (e.g., "Underwriting Policy Hold") and a description for the underwriting issue (e.g., "Hurricane").

In addition, the user can create hold rules via controls presented in area 316 of the user interface. The rule specifies additional criteria for identifying the policies and operations to be put on hold. In this example, the rule specifies a line of business (e.g., personal automobile, homeowner, commercial property, etc.), a type of operation (also referred to as transaction type or job type) (e.g., submission, bind, cancellation, etc.), a date type on the type of transaction/job (e.g., the effective date, the written date, etc.), and the type of coverage (which can be all the coverages or specific coverages applicable to the line of business, such as liability, property damage, towing and labor, etc.) According to the rule shown, the line of business corresponds to personal auto, the type of operation corresponds to submission, the job date type corresponds to effective date, and the coverage corresponds to all coverages. Additional rules can be added. As will be described in greater detail below, the rule set is applied to determine whether the policy hold applies and whether any underwriting issue should be raised.

FIG. 3B shows an embodiment of a hold region configuration user interface. In this example, the user is given a list of counties in which the hold may apply. Other options can be presented in other embodiments, such as zip codes, coordinates, maps with user configurable boundaries, etc.

FIG. 4 is a functional diagram illustrating an embodiment of a user interface that shows a policy processing operation that is subject to the hold. In this example, the policy is prevented from being bound due to the hurricane related policy hold starting on Jan. 26, 2012. This information is displayed to the user.

Figure 5:
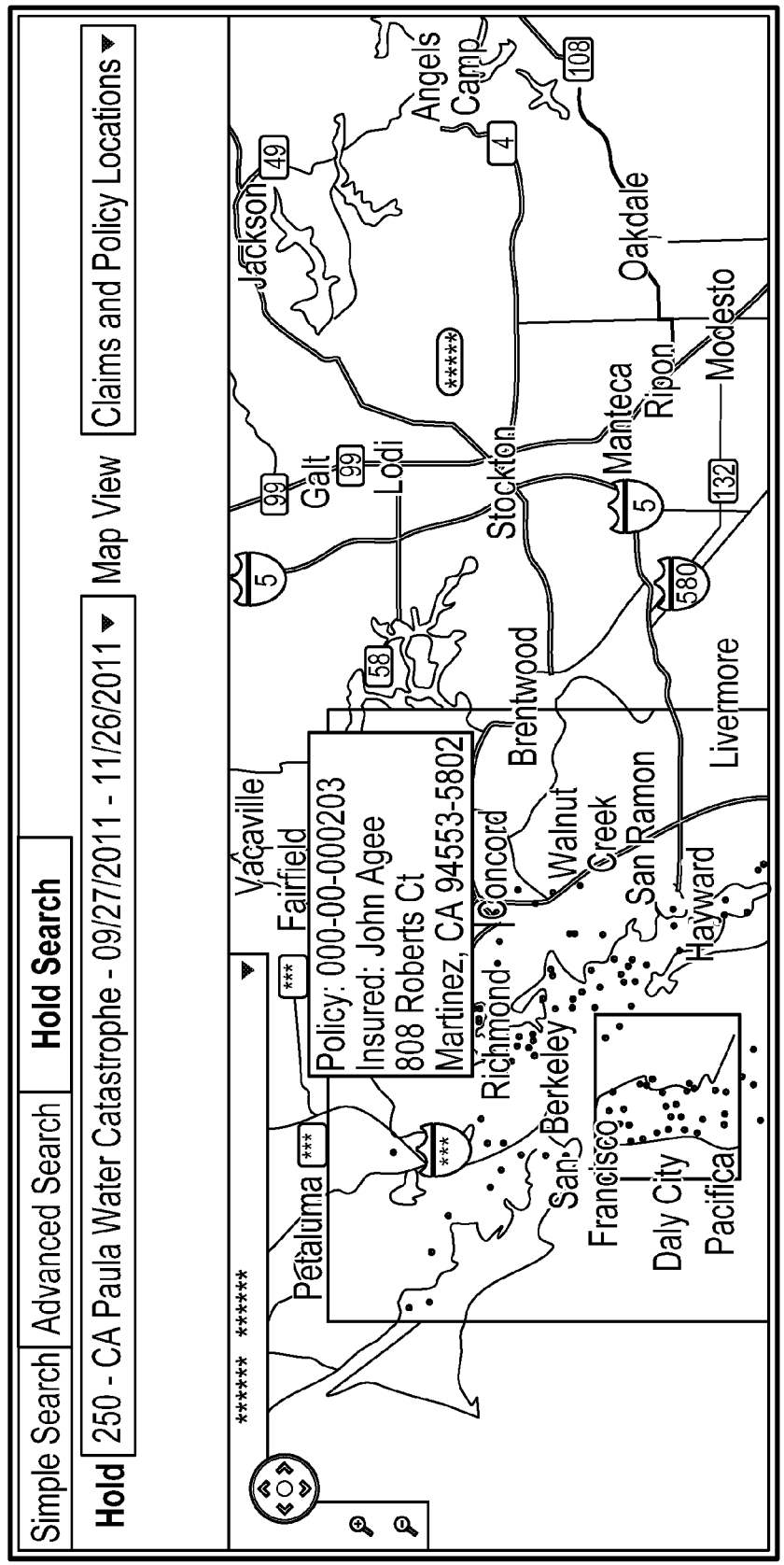
FIG. 5 is a functional diagram illustrating an embodiment of a mapping tool.

In some embodiments, a mapping tool is used to specify a hold region and/or display policy processing operations that are on hold. FIG. 5 is a functional diagram illustrating an embodiment of a mapping tool. In this example, an interactive map is shown, and the user can specify a hold region by using a tool that draws the boundaries of the region. Existing policies within the hold region are displayed.

As discussed above in connection with step 208 of FIG. 2, in some embodiments, when a policy processing operation is subject to a policy hold, an underwriting issue is specified. The underwriting issue should be resolved at some point. For purposes of example, an embodiment of an insurance policy management environment that resolves underwriting issues at specific blocking points during the insurance policy underwriting process is described in detail below. Other implementations are possible.

Figure 6A:
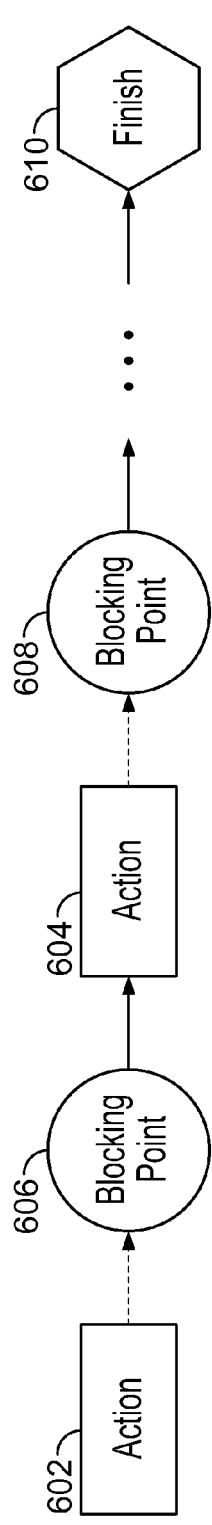
FIG. 6A is a diagram illustrating an example of an insurance policy underwriting process and its associated states.

FIG. 6A is a diagram illustrating an example of an insurance policy underwriting process and its associated states. In this example, the users of the system perform a series of insurance processing operations such as 602 and 604. A set of blocking points such as 606 and 608 occur between action stages. At each blocking point, the policy is examined and issues are identified. In some embodiments, one or more sets of rules (such as rule set 316 shown in FIG. 3A) associated with the blocking point are applied to available policy information to determine whether any issues exist. As used herein, an issue refers to a condition pertaining to a specific insurance policy that indicates a potential problem with the policy. Issues typically require approval, either automatically by the system or manually by an authorized user, in order to complete the process. However, issues may be defined to not require approval, and to serve only to convey information. In some embodiments, each issue has a corresponding database entry. In some embodiments, the underwriting process is temporarily blocked until active issues requiring approval are approved. The system keeps track of issues that have been approved so that re-approval is not necessarily required for the same issue later. The process continues until all the processing operations have been performed and all the blocking points have been cleared. A policy hold related issue would indicate that the policy processing operation is put on hold because the policy hold applies. A policy hold related issue can be automatically approved (i.e., released) because the hold is no longer in effect, or manually by a user who has the authority to override the holds. At 610, the underwriting process completes and a policy is issued to the applicant.

Figure 6B:
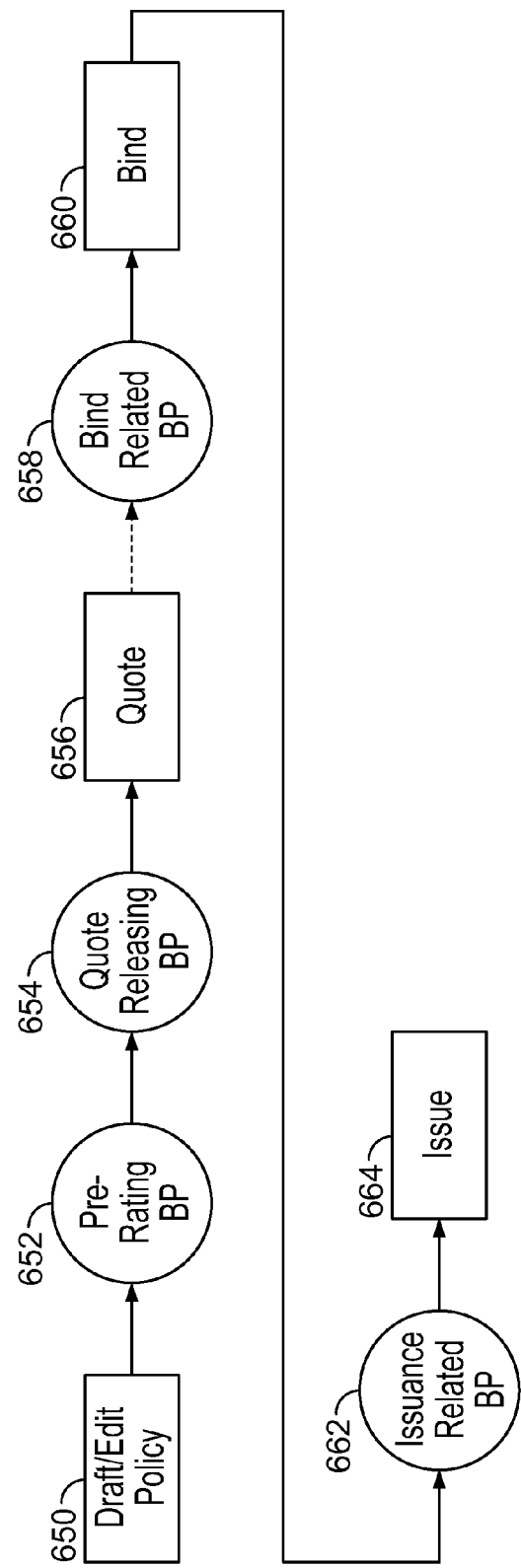
FIG. 6B is a diagram illustrating a more specific example of policy underwriting states.

FIG. 6B is a diagram illustrating a more specific example of policy underwriting states. A user such as an insurance agent performs processing operation 650, such as drafting or editing a policy, and optionally validating the policy. Before a quote is provided to the user, quote related blocking points 652 and 654 are encountered. In this example, 652 is a pre-rating blocking point at which issues affecting the generation of a policy quote or the willingness of the insurer to provide a quote are identified. For example, a rule may indicate that approval is required to quote a policy for any automobile worth more than $100,000. If the applicant indicated that he would like to obtain a policy for a car worth more than $100,000, the issue relating to the value of the car is identified during the pre-rating blocking point and the agent may receive an indication that the underwriting process cannot proceed until this issue has been approved. The agent may approve the issue if he has the authority to do so, or seek approval from another user, or repeat action 650 to edit the policy or draft a new policy (for example, lowering the estimated value of the car or excluding the car from the policy) such that the issue no longer applies.

Once the policy clears the pre-rating blocking point, quote release blocking point 654 is encountered. This blocking point determines whether the quote is ready to be released to the agent and/or the applicant. Issues that block at this point are typically based on properties of the generated quote. Examples of quote release issues include total premium exceeding a threshold, or manual rating required (in which an automated quote cannot be generated, and a user must manually calculate and enter the quote). If issues are identified, progress can be blocked, and approval can be required for certain issues or the user may have to repeat action 650. If no issue is identified with the quote release blocking point, or if the issues do not require immediate approval, or if the issues are resolved, action 656 is performed and a quote is generated and released to the user and/or applicant. A bind related blocking point 658 is encountered next, where issues relating to policy binding are identified and resolved if necessary. Examples of issues blocking progress at the bind related blocking point may include missing required documentation, required proof of eligibility for a claimed discount, required proof of residency in a particular locale, or evidence supporting garaging conditions (e.g., locked, alarmed) claimed in the policy submission.

Once the bind related blocking point is passed, the policy is bound at 660. In other words, the terms of the policy are acceptable to both the customer and the insurance company, and a contract between the two parties is formed. An issuance related blocking point 662 is encountered next. Issues that block at this point are typically related to final conditions of payment and issuance, for example, a requirement to verify ability of the customer to pay for the policy, or a requirement to obtain a bill of sale for an item to be covered under the policy. This latter condition can arise when the customer needs to show evidence of a bound policy to purchase an expensive vehicle; the insurer will then typically require evidence that the vehicle was actually purchased before finally issuing the policy. Upon resolving any issuance related issues, the policy is issued to the user at 664.

Certain issues may be generated by a blocking point but no approval is required immediately. For example, at the pre-rating blocking point, an issue (e.g., an entry in a database) is generated to make note of the fact that the car has been in an accident. No approval is needed at this stage; however, at a later stage such as at the issuance-related blocking point, approval may be required for any car that has previously been in an accident. Thus, the earlier created issue would need to be approved before the policy can be finalized.

Issues can also be generated at times other than at a blocking point. For example, issues may be generated based on elapsed time, as when in a renewal process, at 30 days before the policy is due to renew, the system may check to see that all required documents have been received.

In some embodiments that support policy holds, an issue can be generated whenever it is determined that a policy processing operation is subject to a policy hold. The determination can take place whenever a batch process for checking policy holds is run, as well as at each blocking point.

Figure 7:
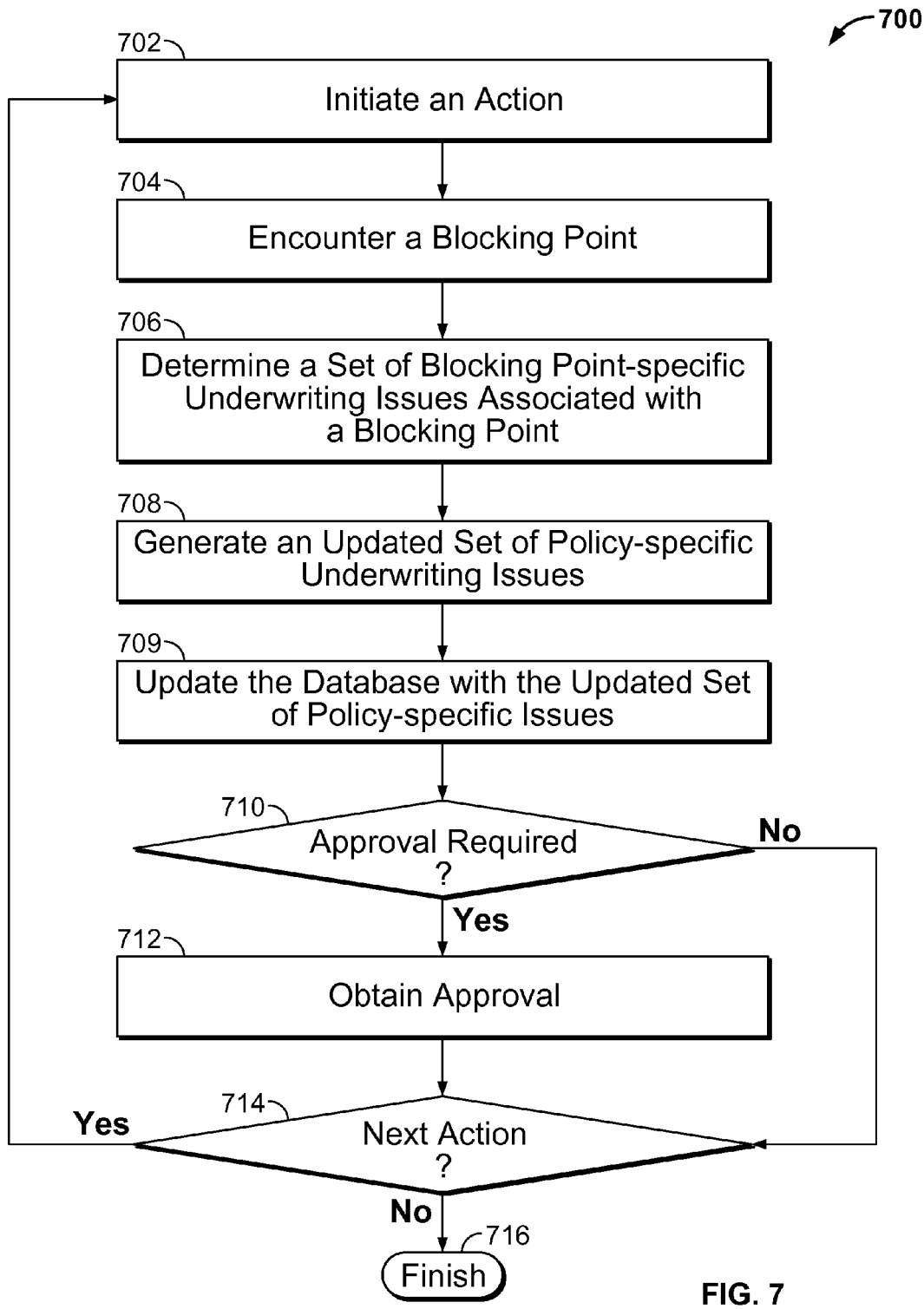
FIG. 7 is a flowchart illustrating an embodiment of a process for managing insurance policy underwriting.

FIG. 7 is a flowchart illustrating an embodiment of a process for managing insurance policy underwriting. Process 700 may be implemented on a system such as 100. The process starts at 702, where an action such as policy drafting/editing, quoting, binding, etc., is initiated. At 704, a blocking point is encountered and an indication that the blocking point has been reached is received.

At 706, a set of blocking point-specific issues are determined. In some embodiments, each blocking point is associated with a checking set, and the blocking point-specific issues are determined based on the results of the previously executed action and the checking set associated with the blocking point. The checking set includes a set of rules configured by the insurance carrier or other system administrator. In some embodiments, to determine blocking point specific issues, information relating to the policy is compared with certain limit values associated with the rules.

In some embodiments, to support the policy hold feature, an underwriting hold checking set (e.g., a checking set to check holds that are due to pending natural disasters) and a regulatory hold checking set (e.g., a checking set to check holds that are due to pending regulatory approvals) are defined. Depending on implementation, these checking sets can be set at all the block points (e.g., quote, bind, issue) so that when a hold applies, the user will be notified before the policy processing operation advances to the next step in the underwriting process, or set at different blocking points (e.g., the underwriting hold checking set is set at the bind blocking point, and the regulatory hold checking set is set at the quote blocking point.) Referring to the example user interface shown in FIG. 3A, an underwriting policy hold checking set is specified, as is a rule that checks the line of business, job type, job date type, and coverage values.

At 708, an updated set of policy-specific underwriting issues is generated. In some embodiments, to generate the updated set of policy-specific underwriting issues, the set of blocking point specific underwriting issues determined in 706 (e.g., that a policy is subject to a policy hold) and any existing policy-specific underwriting issues are resolved if possible. Details of how to resolve the issues and generate the updated set of policy-specific underwriting issues are described below. At 709, the updated set of policy-specific underwriting issues is updated in the database.

At 710, it is determined whether the issues in the updated set of policy-specific underwriting issues require approval. If so, approval is obtained at 712. How to obtain approval for a specific issue is described in greater detail below. 710 and 712 may be repeated as needed until all the issues requiring approval have been approved. Multiple approvals may also take place in parallel.

The process then proceeds to 714. If the next action is available, the process is repeated at 702; otherwise, the process completes at 716 and the policy is finalized and issued to the user.

Figure 8:
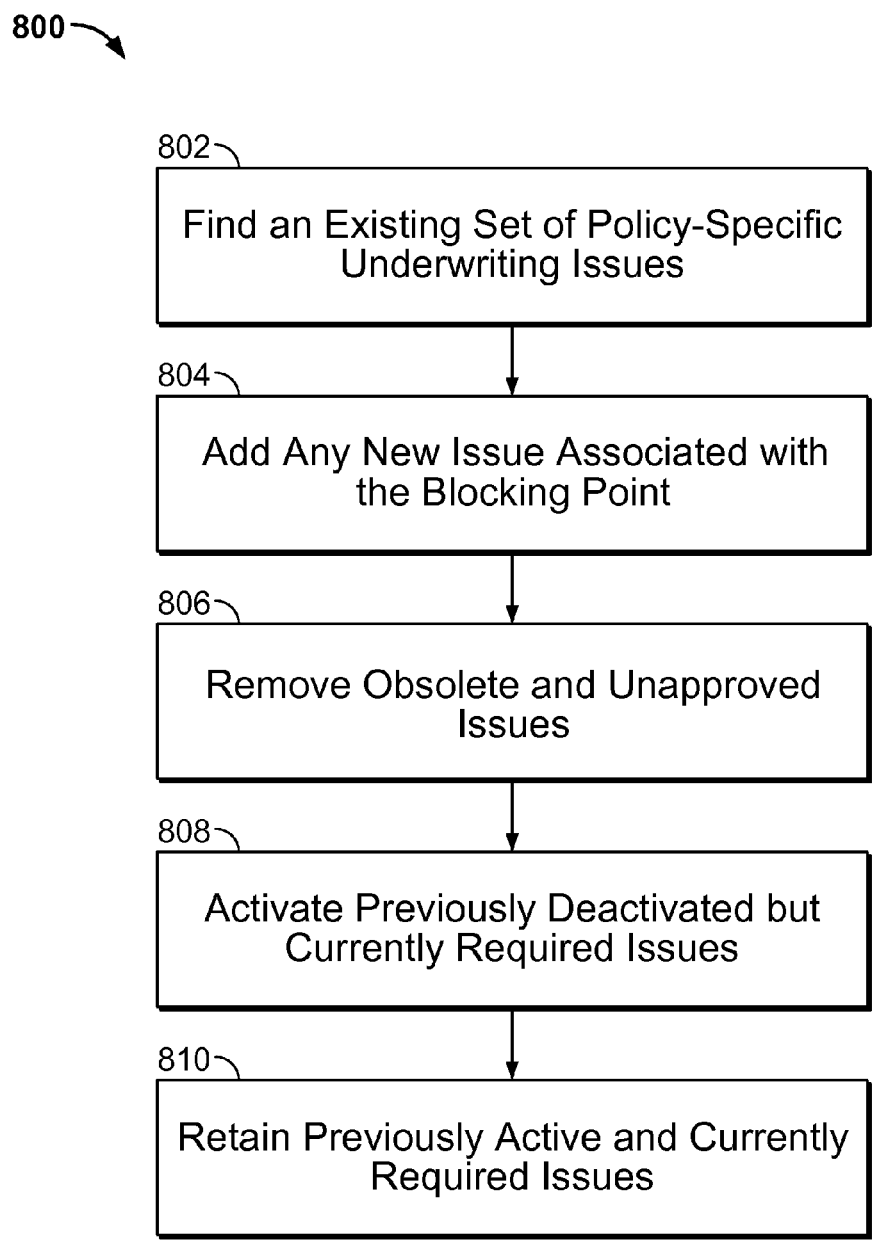
FIG. 8 is an embodiment of a process for generating an updated set of policy-specific underwriting issues.

FIG. 8 is an embodiment of a process for generating an updated set of policy-specific underwriting issues. Process 800 may be used to implement step 708 in process 700, while a policy is being underwritten and a blocking point is encountered. The process starts at 802, where an existing set of policy-specific underwriting issues relating to the policy being underwritten is found in the database. For a new policy, the number of existing issues starts at 0.

At 804, any new issue associated with the blocking point is determined. In some embodiments, each blocking point is associated with a corresponding checking set that includes certain rules, and the application of the rules to policy data can lead to new issues. In this example, a checking set that corresponds to the current blocking point is selected, and the rules in the checking set are applied to generate new issues. The system is set up to allow flexible configuration of rules and checking sets. For example, the age of the car, the state in which the car is registered, and any other information may trigger certain rules to generate corresponding issues, such as a car that is more than five years old, a car that is registered in California, etc. These issues are added to a list or are stored in the database. In some embodiments, the rules may have the format of "parameter comparator value," where parameter corresponds to the parameter to be examined, comparator corresponds to a comparison operator such as less than, less than or equal to, equal to, greater than, greater than or equal to, etc., and value corresponds to a limit value of the issue. For example, "premium greater than 1,000" is a rule that would generate to an issue whenever the premium of the policy exceeds $1000. Alternatively, or in addition, rules may perform complex calculations of multiple parameters in order to determine whether an issue should be generated, or to calculate a value to be associated with the issue. For example, a calculation of total driving experience might include inputs such as years driving, average miles driven per year, training courses completed, etc. Inputs may also be non-numeric, including, for example, membership or exclusion from a set of values, string-based values, etc.

Referring again to FIG. 3A, the rule applies for a policy that is in the line of business of personal automobile, where the job type is submission and the job's effective date overlaps with the effective date of the hold period. In other words, a policy hold related issue is created if a policy and its associated processing operation match all the aspects of the rule.

At 806, any obsolete and unapproved issue is removed. An issue is deemed obsolete if the issue no longer applies due to policy change, time passing, etc. For example, a policy may initially indicate that the car would be driven by a teenage driver, thus a teenage driver issue was created at the pre-rating blocking point. Presently, at the quote-related blocking point, the applicant changes his mind and takes the teenage driver off the policy, thus rendering the issue obsolete. Alternatively, the issue may become obsolete because the policy was created a week ago but the driver turned 20 today. As another example, a policy hold related issue may become obsolete because the hold period has ended. If an obsolete issue has not been approved, it is removed from the list of policy-specific issues. In the event that the obsolete issue has already been approved, it is retained so that re-approval is not required should the issue become relevant again. An obsolete but approved issue is referred to as a deactivated issue.

At 808, any previously deactivated but currently required issues are activated. A deactivated issue may become current and may require re-approval because of new rules/checking sets at the current blocking point, policy change, limitation on the validity period associated with the approval, changes to company policy or regulations, etc. At 810, any previously active and currently required issues are retained. In some embodiments, these issues are added to the updated set of policy-related issues.

The process can be illustrated using the following example: assuming that at 802, the existing set of policy-specific underwriting issues in the database is found to include issues A, B, C*, where A and B are active issues, and C* is an issue that has been deactivated (i.e., obsolete but approved). At 804, application of rules in the current checking set causes a new issue D to be added. At 806, the application of the rules in the current checking set indicates that issue B no longer applies. Since B has not been approved, it is removed from the list. Had B been approved previously, it would have been kept on the list but denoted as B* to indicate that it is deactivated. At 808, the application of the rules in the current checking set indicates that issue C is currently required. Thus, C* is reactivated. In addition, A is retained at 810. Thus, the updated set of policy-specific underwriting issues includes A, C, and D. By using the business logic to track issues and approvals associated with the issues, the underwriting process is allowed to continue despite the existence of certain issues, and the same issue is not required to be approved multiple times at different stages during the same underwriting process.

Figure 9:
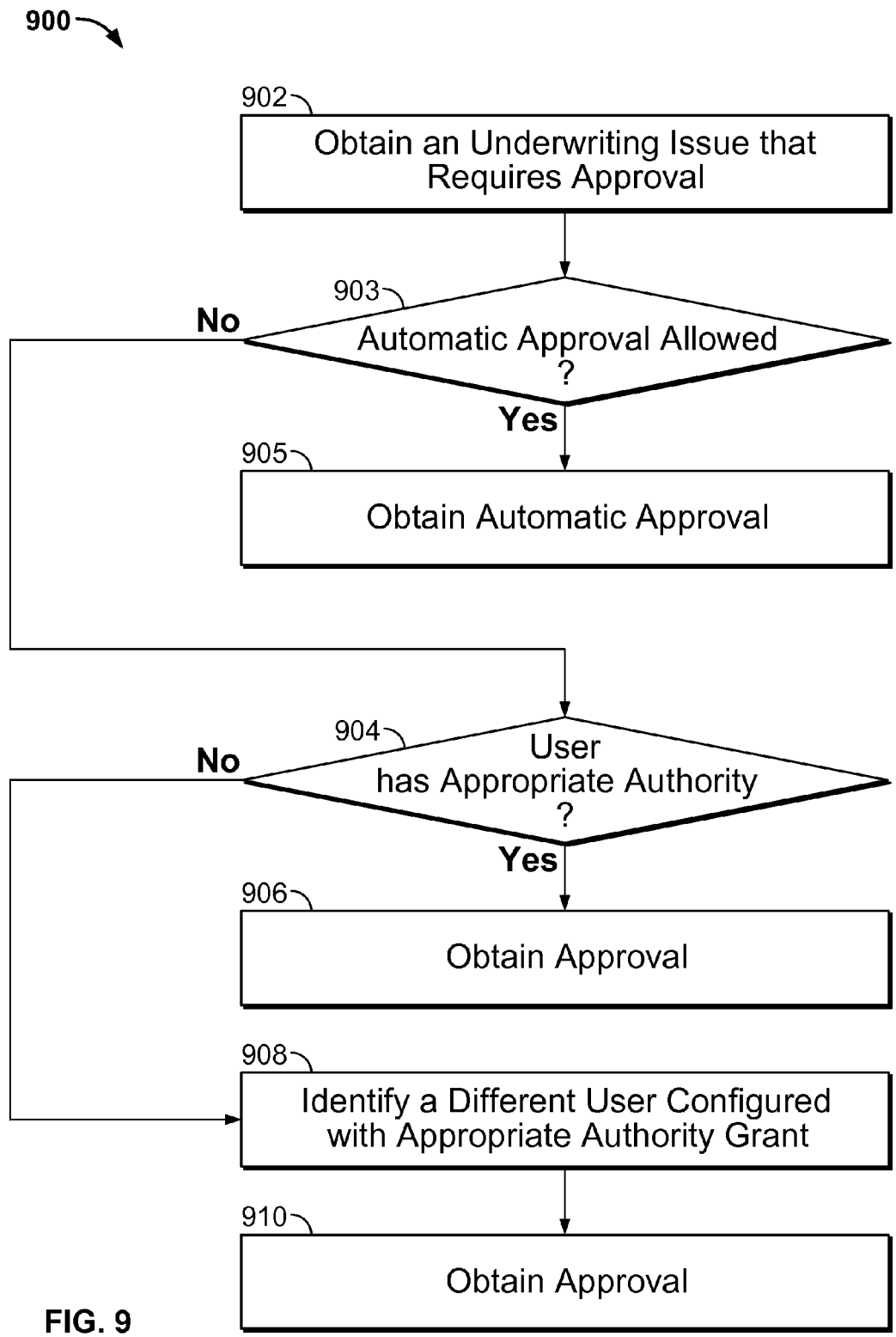
FIG. 9 is an embodiment of a process for obtaining approval for an underwriting issue.

In some embodiments, different users in the insurance policy management system are configured with different levels of authority grants for approving different issues. FIG. 9 is an embodiment of a process for obtaining approval for an underwriting issue. Process 900 may be implemented on a system such as 100, and is used to implement step 712 in process 700.

At 902, an underwriting issue associated with the insurance policy and requiring approval is obtained. The issue may be obtained as a result of step 708 of process 700, or retrieved from a database, a cache, or any other appropriate storage for policy-specific underwriting issues.

At 903, it is determined whether the issue can be automatically approved. Some issues are configured with default approval values, and are allowed to be automatically approved if the default approval values are within the user's authority grant limit. For example, an issue may indicate that the policy premium is set to a default approval value of $600, thus any user who is allowed to approve a policy with a premium of $600 or more is allowed to automatically approve this issue. If a user has the authority grant to approve policies with premiums up to $1000, the issue of a $600 premium is automatically approved. The default approval value may also be a calculated value. For example, the default approval value may be computed as a percentage of the premium (such as 110%) so that when the approval is granted, small changes to the premium amount will not trigger the need for another approval. As another example, an underwriting manager may have an authority grant for regulatory and underwriting holds. If the underwriting manager issues a submission that would normally be blocked based on the policy hold rules, the submission would be automatically approved. In this case, there are no policy limits such as premium amounts on the regulatory and underwriting hold grants. As long as a user has this grant added to their profile, the submissions they issue would not be blocked by the policy hold.

If automatic approval is allowed, it is obtained at 905 and the process completes for this underwriting issue.

If the underwriting issue requires user approval, at 904, it is determined whether a user processing the policy (such as the agent handling the policy quote) has appropriate authority to approve the underwriting issue. In some embodiments, the determination includes determining whether the use is configured with an authority grant that is applicable to the underwriting issue, and, in the event that the authority grant is associated with a limit value, comparing the limit value with an issue value that is associated with the underwriting issue. In some embodiments, the comparison is done by using a configurable comparator and has the format of "issue_value comparator limit_value." The comparator is configurable by the insurance carrier/system administrator. For example, suppose that the underwriting issue is that the premium is $1,200, the configurable comparator is set to "is less than," and the user has an authority grant with a policy premium approval limit value of $1,500. The result of the comparison "premium limit value ($1,200) is less than authority grant limit ($1,500)" is true. Thus, it is determined that the agent is allowed to approve this premium issue. As another example, suppose that the underwriting issue is that the state of registration for the vehicle is California, the configurable comparator is set to "is the same as," and the user has an authority grant to approve policies in Nevada only. The result of the comparison "vehicle state (California) is the same as authority grant state (Nevada)" is false, and the user does not have the authority to approve the issue. Thus, at 906, if the user is determined to have the authority to approve the underwriting issue, approval is obtained. Otherwise, at 908, a different user configured with appropriate authority grant is identified and approval is obtained from this user at 910. In some embodiments, special authority grants may be defined to be given to trusted users. One such grant would be the authority to approve any issue, to be given to a high-level manager. Another example of a special grant would be the authority to approve a specific type of issue, irrespective of the issue value; this grant might be given to a trusted specialist in a particular type of issue. For the policy hold feature, in some embodiments no user has the authority to override the hold related issue and release the hold manually. In some embodiments, however, certain users such as an insurance company executive can be allowed to release the hold for a particular policy.

Managing insurance policy processing using insurance policy holds has been disclosed. The techniques disclosed provide a scalable solution to insurance carriers to correctly handle policy holds for a large number of policies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing insurance policy processing, comprising:
    one or more processors configured to:
        receive a set of insurance policy hold criteria specifying an insurance policy hold, the insurance policy hold criteria comprising an insurance policy hold period during which the insurance policy hold is in effect;
        receive a request to execute an insurance policy processing operation on an insurance policy;
        determine, based at least in part on the set of policy hold criteria, that the insurance policy processing operation is subject to the insurance policy hold;
        disallow the insurance policy processing operation from being executed;
        determine that the insurance policy hold is to be released; and
        allow the insurance policy hold to be released; and
    one or more memories coupled to the one or more processors, configured to provide the one or more processors with instructions.

2. The system of claim 1, wherein the set of insurance policy hold criteria includes one or more of: a hold period, a geographical location, a line of business, and a type of operation.

3. The system of claim 1, wherein to determine based at least in part on the set of policy hold criteria, that the insurance policy processing operation is subject to the insurance policy hold includes:
    to compare the set of policy hold criteria with corresponding attributes associated with the insurance policy or the insurance policy processing operation; and
    to determine that the set of policy hold criteria match the corresponding attributes.

4. The system of claim 1, wherein the one or more processors are further configured to create an underwriting issue specifying that the insurance policy processing operation is subject to the insurance policy hold.

5. The system of claim 1, wherein to determine based at least in part on the set of policy hold criteria, that the insurance policy processing operation is subject to the insurance policy hold includes:
    to determine that a written date associated with the insurance policy occurred on or after a start date of the insurance policy hold period; and
    to determine that an effective period of the insurance policy overlaps with the insurance policy hold period.

6. The system of claim 1, wherein to allow the insurance policy hold to be released includes to send an indication that the insurance processing operation is allowed to proceed.

7. The system of claim 1, wherein to allow the insurance policy hold to be released includes to invoke the insurance policy processing operation.

8. The system of claim 1, wherein the insurance policy hold includes an underwriting hold.

9. The system of claim 1, wherein the insurance policy hold includes a regulatory hold.

10. The system of claim 1, wherein to allow the insurance policy hold to be released includes to automatically release the insurance policy hold.

11. A method for managing insurance policy processing, comprising:
- receiving a set of insurance policy hold criteria specifying an insurance policy hold, the insurance policy hold criteria comprising an insurance policy hold period during which the insurance policy hold is in effect;
- receiving a request to execute an insurance policy processing operation on an insurance policy;
- determining, using one or more computer processors and based at least in part on the set of policy hold criteria, that the insurance policy processing operation is subject to the insurance policy hold;
- disallowing the insurance policy processing operation from being executed;
- determining that the insurance policy hold is to be released; and
- allowing the insurance policy hold to be released.

12. The method of claim 11, wherein the set of insurance policy hold criteria includes one or more of: a hold period, a geographical location, a line of business, and a type of operation.

13. The method of claim 11, wherein determining based at least in part on the set of policy hold criteria, that the insurance policy processing operation is subject to the insurance policy hold includes:
- comparing the set of policy hold criteria with corresponding attributes associated with the insurance policy or the insurance policy processing operation; and
- determining that the set of policy hold criteria match the corresponding attributes.

14. The method of claim 11, further comprising creating an underwriting issue specifying that the insurance policy processing operation is subject to the insurance policy hold.

15. The method of claim 11, wherein determining based at least in part on the set of policy hold criteria, that the insurance policy processing operation is subject to the insurance policy hold includes:
- determining that a written date associated with the insurance policy occurred on or after a start date of the insurance policy hold period; and
- determining that an effective period of the insurance policy overlaps with the insurance policy hold period.

16. The method of claim 11, wherein allowing the insurance policy hold to be released includes sending an indication that the insurance processing operation is allowed to proceed.

17. The method of claim 11, wherein allowing the insurance policy hold to be released includes invoking the insurance policy processing operation.

18. The method of claim 11, wherein the insurance policy hold includes an underwriting hold.

19. The method of claim 11, wherein the insurance policy hold includes a regulatory hold.

20. The method of claim 11, wherein allowing the insurance policy hold to be released includes automatically releasing the insurance policy hold.

21. A computer program product for managing insurance policy processing, the computer program product being embodied in a tangible non-transitory computer readable storage medium and comprising computer instructions for:
- receiving a set of insurance policy hold criteria specifying an insurance policy hold, the insurance policy hold criteria comprising an insurance policy hold period during which the insurance policy hold is in effect;
- receiving a request to execute an insurance policy processing operation on an insurance policy;
- determining, based at least in part on the set of policy hold criteria, that the insurance policy processing operation is subject to the insurance policy hold;
- disallowing the insurance policy processing operation from being executed;
- determining that the insurance policy hold is to be released; and
- allowing the insurance policy hold to be released.

22. The computer program product of claim 21, wherein the set of insurance policy hold criteria includes one or more of: a hold period, a geographical location, a line of business, and a type of operation.

23. The computer program product of claim 21, wherein determining based at least in part on the set of policy hold criteria, that the insurance policy processing operation is subject to the insurance policy hold includes:
- comparing the set of policy hold criteria with corresponding attributes associated with the insurance policy or the insurance policy processing operation; and
- determining that the set of policy hold criteria match the corresponding attributes.

24. The computer program product of claim 21, further comprising creating an underwriting issue specifying that the insurance policy processing operation is subject to the insurance policy hold.

25. The computer program product of claim 21, wherein determining based at least in part on the set of policy hold criteria, that the insurance policy processing operation is subject to the insurance policy hold includes:
- determining that a written date associated with the insurance policy occurred on or after a start date of the insurance policy hold period; and
- determining that an effective period of the insurance policy overlaps with the insurance policy hold period.

26. The computer program product of claim 21, wherein allowing the insurance policy hold to be released includes sending an indication that the insurance processing operation is allowed to proceed.

27. The computer program product of claim 21, wherein allowing the insurance policy hold to be released includes invoking the insurance policy processing operation.

28. The computer program product of claim 21, wherein the insurance policy hold includes an underwriting hold.

29. The computer program product of claim 21, wherein the insurance policy hold includes a regulatory hold.

30. The computer program product of claim 21, wherein allowing the insurance policy hold to be released includes automatically releasing the insurance policy hold.

\* \* \* \* \*